(12) United States Patent
Garzitto et al.

(10) Patent No.: US 10,926,518 B2
(45) Date of Patent: Feb. 23, 2021

(54) MULTILAYER FILM

(71) Applicant: TAGHLEEF INDUSTRIES S.P.A. CON SOCIO UNICO, San Giorgio di Nogaro (IT)

(72) Inventors: Valerio Garzitto, Tavagnacco (IT); Francesca Piasente, Gonars (IT)

(73) Assignee: TAGHLEEF INDUSTRIES S.P.A. CON SOCIO UNICO, San Giorgio di Nogaro (IT)

( * ) Notice: Subject to any disclaimer, the term of this patent is extended or adjusted under 35 U.S.C. 154(b) by 273 days.

(21) Appl. No.: 16/303,983

(22) PCT Filed: May 23, 2017

(86) PCT No.: PCT/EP2017/062374
§ 371 (c)(1),
(2) Date: Nov. 21, 2018

(87) PCT Pub. No.: WO2017/202827
PCT Pub. Date: Nov. 30, 2017

(65) Prior Publication Data
US 2020/0316923 A1   Oct. 8, 2020

(30) Foreign Application Priority Data

May 23, 2016 (IT) .......................... UA2016A003676

(51) Int. Cl.
*B32B 27/08* (2006.01)
*B29C 48/21* (2019.01)
(Continued)

(52) U.S. Cl.
CPC .......... *B32B 27/08* (2013.01); *B29C 48/0018* (2019.02); *B29C 48/022* (2019.02);
(Continued)

(58) Field of Classification Search
CPC ... B29C 48/0018; B29C 48/022; B29C 48/08; B29C 48/21; B29C 48/307; B29C 55/005; B29C 55/143; B29K 2023/12; B29K 2077/00; B29K 2995/0039; B29K 2995/004; B29L 2007/008; B32B 2250/05;
(Continued)

(56) References Cited

U.S. PATENT DOCUMENTS

2011/0300363 A1   12/2011   Enzinger et al.

FOREIGN PATENT DOCUMENTS

| EP | 0546709 A1 | 3/1993 |
| EP | 1554113 A1 | 7/2005 |
| EP | 2030784 A1 | 3/2009 |

OTHER PUBLICATIONS

International Search Report dated Jul. 10, 2017 re: Application No. PCT/EP2017/062374, pp. 1-3, citing: EP 1 554 113 A1, EP 2 030 784 A1 ad US 2011/300363 A1.
(Continued)

*Primary Examiner* — Lawrence D Ferguson
(74) *Attorney, Agent, or Firm* — Cantor Colburn LLP (57) ABSTRACT

Bi-axially orientated polypropylene film having a thickness of between 10 μm and 120 μm, suitable to make packing, flexible packages, laminated products and labels, where the film is obtained by means of flat die co-extrusion and sequential stretching respectively in the machine direction and in a direction transverse to the machine direction.

16 Claims, 1 Drawing Sheet

(51) Int. Cl.

| | |
|---|---|
| *B29C 48/08* | (2019.01) |
| *B29C 48/00* | (2019.01) |
| *B29C 48/305* | (2019.01) |
| *B29C 55/00* | (2006.01) |
| *B29C 55/14* | (2006.01) |
| *B32B 27/20* | (2006.01) |
| *B32B 27/30* | (2006.01) |
| *B32B 27/32* | (2006.01) |
| *B32B 27/34* | (2006.01) |
| *B29K 23/00* | (2006.01) |
| *B29K 77/00* | (2006.01) |
| *B29L 7/00* | (2006.01) |

(52) U.S. Cl.
CPC .............. *B29C 48/08* (2019.02); *B29C 48/21* (2019.02); *B29C 48/307* (2019.02); *B29C 55/005* (2013.01); *B29C 55/143* (2013.01); *B32B 27/20* (2013.01); *B32B 27/306* (2013.01); *B32B 27/308* (2013.01); *B32B 27/32* (2013.01); *B32B 27/34* (2013.01); B29C 2948/92647 (2019.02); B29K 2023/12 (2013.01); B29K 2077/00 (2013.01); B29K 2995/004 (2013.01); B29K 2995/0039 (2013.01); B29L 2007/008 (2013.01); *B32B 2250/05* (2013.01); *B32B 2255/10* (2013.01); *B32B 2255/20* (2013.01); *B32B 2255/205* (2013.01); *B32B 2255/26* (2013.01); *B32B 2270/00* (2013.01); *B32B 2307/518* (2013.01); *B32B 2307/702* (2013.01); *B32B 2307/704* (2013.01); *B32B 2519/00* (2013.01); *B32B 2553/00* (2013.01)

(58) Field of Classification Search
CPC ............ B32B 2255/10; B32B 2255/20; B32B 2255/205; B32B 2255/26; B32B 2270/00; B32B 2307/518; B32B 2307/702; B32B 2307/704; B32B 2519/00; B32B 2553/00; B32B 27/08; B32B 27/20; B32B 27/306; B32B 27/308; B32B 27/32; B32B 27/34
See application file for complete search history.

(56) References Cited

OTHER PUBLICATIONS

Written Opinion dated Jul. 10, 2017 re: Application No. PCT/EP2017/062374, pp. 1-6, citing: EP 1 554 113 A1, EP 2 030 784 A1 ad US 2011/300363 A1.

fig. 1 fig. 2 fig. 3 fig. 4 fig. 5 fig. 6

MULTILAYER FILM

TECHNICAL FIELD

The present disclosure concerns a bi-axially orientated polypropylene (BOPP) multilayer film, usable to make packing and packages for the food sector, or labels, obtained by means of co-extrusion through a flat head extrusion die.

BACKGROUND

It is well known that, generally, films used as food packaging are formed by at least one base layer or core layer, which may be based, for example, on propylene homopolymer, copolymer or terpolymer, and two or more skin layers, or outer layers, generally based on a propylene homopolymer, copolymer, and/or terpolymer. One or more intermediate layers, or tie layers, which bind the core layer to the respective skin layer may be provided on each side of the base layer, depending on the needs.

To realize such films, the standard and cheaper technique, preferred in the field, is the flat head coextrusion with sequential stretching.

This technique provides, after co-extruding and casting a film on the cooling roller, to stretch the film in the longitudinal direction of the machine (MD stretching) and subsequently to stretch the film in the direction transverse to the machine direction (TD stretching).

The sequence of such stretching operations determines the known bi-axially orientated polypropylene (BOPP) structure and is henceforth addressed as BOPP process.

A problem of the type of film described above is that generally such film presents good barrier properties to moisture, but the oxygen barrier may not be sufficient for critical applications.

The oxygen barrier is an important property for a film used for packages and food packaging, as it allows longer shelf life of the packed food, while also properly preserving its organoleptic properties.

In addition, another critical factor of this type of film is the poor barrier effect to mineral oils. Mineral oils are contaminants usually present in cartons and cardboards used for packaging, which can be absorbed especially by fatty foods if they are packaged in films that do not have an adequate and specific barrier against them.

Furthermore, polypropylene generally presents a low wettability and a low surface tension, that make it poorly suited for printing, for this reason, when required, it is necessary to use lacquers with a high surface energy or a primer.

To achieve the oxygen and mineral oils barrier effect it is known to make a metallic film by depositing a thin layer, or sheet, of metal on the film (metallization). However, this procedure will lead to an increase in costs and production times.

To achieve a high oxygen barrier while avoiding metallization, the use of polyethylene vinyl alcohol (EVOH) is also known. EVOH, however, is not normally compatible with polypropylene; furthermore, since its crystallization temperature is higher than the stretching temperature traditionally used, this can cause the breakage of the crystals and, as a consequence, a drastic reduction of the oxygen barrier effect.

The production of a film based on polypropylene and EVOH therefore requires expensive and specific technologies.

Films which comprises both a metallization layer and an EVOH layer which can be applied by coating are also known, but such films, as well as requiring high production costs, present the disadvantages mentioned before.

To provide oxygen barrier, bi-axially oriented polyamide, or Nylon, films are widely used as components of multilayer structures with polyolefin films, e.g. polypropylene cast films. In such structures, which typically employ polyamide layers of 12 or 15 μm thickness, the polyamide layers provide oxygen barrier and/or shrink. Such films are typically used in thermoformed and/or shrinkable cheese and meat packages.

The use of polyamide (PA) in combination with polypropylene (PP) is also known, since the polyamide has good oxygen barrier qualities, higher than polypropylene.

Polyamide also exhibits high surface tension, which makes the polymer very suitable for printing even after long time intervals, for example even eighteen months, without the need to use lacquers or primers.

US 2011/300363 A1 describes a multilayer barrier film having at least three layers and incorporating a polypropylene (PP) carrier layer, an adhesion layer arranged on the PP carrier layer and an external functional layer consisting of an amorphous or partially crystalline polyamide (PA). The multilayer barrier film is produced by co-extrusion of the multilayer film through a flat head extrusion die on a chill roll, and subjecting the solidified primary multilayer film to non-contact simultaneous stretching. In particular US 2011/300363 A1 teaches to use a simultaneous stretching to produce the film to solve the problems of surface defects in the polyamide layer which occur when such film is produced with a sequential stretching process. Such defects mean that in the subsequent application of a metallization no fault-free dense metal layer can be formed, which is essential for high barrier properties, particularly a high barrier action against oxygen. This solution requires a specially made machine, and therefore entails high start-up and running cost.

EP 2 030 784 describes a bi-axially oriented and heat-shrinkable multilayer film that provides high levels of shrink for use in deep-drawing application. The multilayer film comprises at least a first outer heat-sealable polyolefin layer, an inner gas-barrier layer comprising at least one gas barrier resin such as vinilydene chloride copolymers (PVDC) or ethylene-vinyl-alcohol copolymers (EVOH) and a polyamide layer that comprises a major proportion of one or more amorphous polyamides. The polyamide layer could be used as a tie layer between the barrier layer and the polyolefin layer or as an outer anti-abuse layer, requiring in this case a high thickness. Such film is manufactured as a tubular film that is bi-axially oriented in a simultaneous stretching process using the so called trapped-bubble process, thus presenting the drawback of low productivity.

EP 0 546 709 B1 describes a multilayer film having a base layer of propylene homopolymer or copolymer, at least one surface thereof comprising maleic acid modified propylene, and a metallized outer layer (skin layer) comprising amorphous polyamide or a blend of amorphous and semicrystalline polyamides.

EP 1 554 113 B1 describes a metallized multilayer film comprising a first component having a central layer comprising a polypropylene homopolymer, a first skin layer adjacent to the central layer, comprising a thermoplastic material selected from polyethylene, ethylene vinyl alcohol polymer, poly propylene and amorphous polyamide, an intermediate layer adjacent to the first skin layer comprising maleic anhydride modified polypropylene, an aluminum metal layer adjacent to the first skin layer, and a second extruded component or skin layer comprising a polyolefin or a polymer selected from among low density polyethylene.

It is therefore known in the art to produce films comprising polyamide to make films which require high barrier properties, since the polyamide has better characteristics than polyolefin and is less expensive than ethylene vinyl alcohol.

In particular it is know to produce films with polyamide and polypropylene that provide high barrier properties providing sufficiently thick layers of polyamide, or by applying a barrier metal layer to a fault-free polyamide skin layer obtained by simultaneous stretching, or by using polyamide in conjunction with an additional layer of oxygen barrier material such as poly ethylene vinyl alcohol, or EVOH. Typical applications require high levels of shrinkage.

To achieve attractive barrier as well as mechanical properties in a cost efficient process that is widely accessible it is, further, desirable to bi-axially orient such co-extruded film. However, in general polypropylene and polyamide are mutually not compatible with the process parameters normally used to make either BOPP films or oriented polyamide films. Polyamide, in fact, with the stretching parameters commonly used for BOPP films, is very difficult to stretch and tends to burst, creating aesthetic and structural defects that compromise on one hand the sought-after barrier properties and more generally the usability.

To try to overcome the problem of burst and splitting of the polyamide layer in such bi-axial orientation process, it has been attempted to simultaneously film the film in the direction of the machine and in the transverse direction to the machine. Simultaneous stretching, however, has the drawback of low productivity or requires specially made machines and therefore entails high start-up and running costs. The most common machines for manufacture of bi-axially oriented films are, in fact, sequential stretching machines, because they allow for high productivity and are more cost-effective.

BRIEF SUMMARY

The disclosure provides a film formed by at least one bi-axially orientated polypropylene (BOPP) layer and at least one outer layer containing polyamide (PA) having improved oxygen barrier properties, high wettability and superficial tension and at the same time good aesthetic qualities and resistance, even over time, and a low level of shrinkage.

The disclosure further provides a process for making a multilayer film of the above-mentioned low cost type and utilizing the above mentioned standard and economical co extrusion technique.

The Applicant has devised, tested and embodied the present disclosure to overcome the shortcomings of the state of the art and to obtain these and other purposes and advantages.

The present disclosure concerns a bi-axially orientated polypropylene (BOPP) multilayer film, suitable for making packets, flexible packaging, laminated products and labels, and having high surface tension.

The film according to the present disclosure may have a thickness of between 10 µm and 120 µm, and is obtained by co-extrusion with flat head extrusion die and sequential stretching respectively in the machine direction (MD) and in a direction transverse to the machine direction (TD).

According to one aspect of the present disclosure, the film comprises at least:
  a base layer, made of polypropylene, having an outer face and an inner face,
  an outer intermediate layer, or outer tie layer, adjacent to the outer face of the base layer and based on olefin copolymers comprising polar comonomers such as vinyl acetate, alkyl acrylates, alkylmethacrylates, acrylic acid or maleic anhydride,
  an outer skin layer, adjacent to the outer face of the outer tie layer, and based on polyamide.

According to a feature of the disclosure, the outer skin layer comprises a blend of amorphous polyamide and semi-crystalline polyamide, wherein the blend comprises from 25% to 75% (by weight) of amorphous polyamide and from 75% to 25% (by weight) of semicrystalline polyamide.

According to one embodiment of the present disclosure, the film further comprises an inner skin layer, opposite to the outer skin layer, comprising homopolymer, copolymer or terpolymer propylene, copolymers of alpha-olefins comprising ethylene or propylene co-monomers, propylene or ethylene elastomers, polyethylene, or mixtures thereof.

According to a further embodiment, the film further comprises an inner tie layer, disposed between the base layer and the inner skin layer, comprising propylene homopolymer or co-polymer.

According to another embodiment, the film comprises an inner tie layer based on copolymers of olefins comprising polar comonomers such as vinyl acetate, alkyl acrylates, alkyl methacrylates, acrylic acid or maleic anhydride, adjacent to the inner face of the base layer, and an inner skin layer, based on polyamide, adjacent to an inner face of the inner tie layer, wherein said inner skin layer based on polyamide comprises a blend of 25% to 75% (by weight) of amorphous polyamide and 75% 25% (by weight) of semicrystalline polyamide.

In this way, it is possible to obtain a film with symmetrical layers from the inside to the outside, that is from the side facing, in use, to the product to be packaged, and the side facing, in use, to the outside environment.

According to a further embodiment, the film comprises an inner tie layer adjacent to the inner face of the base layer, comprising propylene copolymer or terpolymer, or C2 C3 plastomers, or blends thereof, and an inner skin layer adjacent to an inner face of the inner tie layer, and comprising propylene homopolymer, copolymer or terpolymer, copolymers of alpha-olefins comprising ethylene or propylene comonomers, ethylene or propylene elastomers, polyethylene, or blends thereof.

According to further embodiments, the film comprises an inner tie layer, adjacent to the inner face of the base layer, comprising homopolymer propylene, and an inner skin layer adjacent to an inner face of the inner tie layer, based on a blend of polypropylene copolymers modified with maleic anhydride.

According to this embodiment, the film may also comprise an inner coating layer, adjacent to an inner face of the inner skin layer, including, by way of not limitative example, aliphatic polyurethane.

According to further embodiments, the outer skin layer and/or the inner skin layer, the latter optionally before the application of the inner coating layer, may be subjected to surface treatments, for example chosen from a group comprising corona treatment, flame treatment, plasma treatment, or other technologies.

In a further embodiment, a metal coating layer may be provided outside the outer skin layer.

The film according to the disclosure, thanks to such composition of the outer skin layer, exhibits high adhesion to lacquers, adhesives, inks, providing scratch resistance, and high adhesion to various substrate types.

In the case of metal coating applied to the outer skin layer, the metal layer also has less sensitivity to scratching.

The presence of the outer skin layer according to the disclosure also allows obtaining beneficial and desirable effects such as, but not limited to, embossing, aroma barrier, barrier to specific chemical agents.

The characteristics of the outer skin layer make the use of the film particularly suitable for many different applications. Non-limitative examples of possible applications include: in-mold labels (IMLs), self-adhesive, wrap around, and patch labels, films for overlamination, vertical and horizontal packaging applications, technical applications such as adhesive tapes, tobacco films, film for wrapping, decorative surface films for furniture, automotive, household appliances, or the like.

The film according to the disclosure can also be advantageously used for application in the graphical art field, as a lamination film for supports based on cellulose (paper and cardboard).

The present disclosure also concerns a method to make a bi-axially orientated polypropylene (BOPP) film having a thickness comprised between 10 µm and 120 µm and suitable for the production of packing, flexible packages, laminated products and labels.

The process comprises the following steps:
a first co-extrusion step, by means of a flat die extrusion unit, to produce a co-extruded intermediate product in the form of a film,
a second step of stretching in the machine direction (MD), and
a third step of stretching in a direction transverse to the machine direction (TD) of the intermediate product so as to determine the desired bi-axially orientated structure and define the final thickness of each of the layers.

According to an aspect of the method according to the present disclosure, the first co-extrusion step provides to extrude an intermediate product formed at least by a base layer based on polypropylene and having an outer face and an inner face, an outer tie layer adjacent to the outer face of the base layer, and based on copolymers of olefins comprising polar comonomers such as vinyl acetate, alkyl acrylates, alkyl methacrylates, acrylic acid or maleic anhydride, and an outer skin layer adjacent to an outer face of the outer tie layer and based on polyamide.

According to a further aspect of the disclosure, to extrude the outer skin layer, the process provides to use a blend of amorphous polyamide and semi-crystalline polyamide, comprising 25% to 75% (by weight) of an amorphous polyamide and from 75% to 25% (by weight) of a semi-crystalline polyamide.

According to a further aspect, the second step and the third stretching step involve stretching the intermediate product by a factor from 3 to 6 in the machine direction and subsequently by a factor from 7 to 12 in the direction transverse to the machine direction.

Advantageously, the method according to the disclosure can be carried out by using a standard bi-axial orientation line using a flat head extrusion die as it is used for the manufacture of BOPP, without compromising on the barrier properties and the aesthetical appearance.

BRIEF DESCRIPTION OF THE DRAWINGS

These and other features of the present disclosure will become apparent from the following description of soma embodiments provided by way of non-restrictive example, with reference to the accompanying drawings wherein.

To facilitate understanding, the same reference numbers have been used, where possible, to identify identical common elements in the figures. It is understood that elements and characteristics of one embodiment can conveniently be incorporated into other embodiments without further clarifications.

DETAILED DESCRIPTION

Embodiments described here with reference to FIGS. 1-6 refer to a multilayer film 10, usable, for example, in a non-limiting manner, for the manufacture of packaging and packages for foodstuffs, such as chocolate, snacks, biscuits or other confectionery or salted products, which require a high barrier to oxygen and aromas and moisture control.

Figure 1:
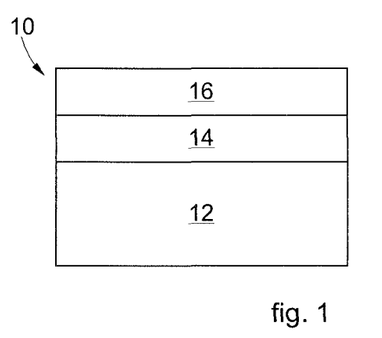
FIG. 1 is a schematic section view of a film according to embodiments described herein.

In accordance with embodiments described using FIG. 1, the film 10 comprises at least the following layers:
a base layer 12, or core layer, based on polypropylene (PP), having an inner face and an outer face;
an outer tie layer 14 adjacent to the outer face of the base layer 12 and based on copolymers of olefins comprising polar comonomers;
and an outer skin layer 16, adjacent to the outer face of the outer tie layer 14, and based on polyamide (PA).

The film 10 can also be used for making labels, for example self-adhesive labels. The high surface tension obtained by the presence of the layer containing polyamide makes these labels suitable for being bonded even in places subject to contaminants, such as the wheels of a motor vehicle, since it acts as a protection, so that these labels retain their own colors and are not subject to yellowing.

The film 10 according to the disclosure also has excellent working and processing characteristics. In particular, the outer skin layer 16 makes it possible to obtain a high surface tension that is stable over time. Moreover, the outer skin layer 16 is compatible with a wider range of inks and lacquers than polyolefin substrates.

The base layer 12 is the thicker layer of the final film 10 and substantially determines the mechanical and rigidity characteristics of such films.

According to some embodiments, the base layer 12 can be made of propylene homopolymer and may include one or more fillers, voiding agents, and/or hard resins, or amorphous resins, and/or additives, depending on the desired properties and physical characteristics.

According to some embodiments, the base layer 12 may have a thickness comprised between about 10 µm and about 100 µm, in particular between about 15 µm and about 70 µm, more in particular between about 17 µm and about 60 µm, depending on type of product to be packaged.

According to possible embodiments, the base layer 12 may contain titanium dioxide (TiO2) in varying amounts in relation to the effect that is desired in the final film 10.

For example, if the white effect is not particularly sought, titanium dioxide may be comprised with a percentage between 1.5% and 2.5% of the amount used for the layer where it is present, but such percentage can increase to the order of 20%-30% if a very white appearance is required.

In accordance with further embodiments, the base layer 12 may contain calcium carbonate ($CaCO_3$), which gives the film 10 an opaque effect. Calcium carbonate may be comprised in a percentage between 1.5% and 23%, in particular between 3% and 20%, even more in particular between 5% and 17% of the total amount of the material in the base layer 12.

According to further variant embodiments, to achieve an opaque effect the base layer 12 may also contain polybutylene terephthalate (PBT), for example, but not limiting, in the case of a film 10 used to make labels in a percentage from 1% to 15%.

According to further variant embodiment, the base layer 12 may contain one or more migratory additives, such as antistatic agents like ethoxylated alkyl amines (EAA), or glycerol monostearate (GMS), or slip agents like amides of fatty acids, like stearic amide, erucamide, behenamide or similar.

The outer tie layer 14, disposed between the base layer 12 and the outer skin layer 16, may be based on copolymers of olefins comprising polar comonomers such as vinyl acetates, alkyl acrylates, alkyl methacrylates, acrylic acid or maleic anhydride, suitable to keep the polypropylene of the base layer 12 bonded to the polyamide of the outer skin layer 16.

According to preferred embodiments, the outer tie layer 14 may comprise on ethylene copolymers comprising polar comonomers such as vinyl acetate, methyl (meth) acrylate, butyl (meth) acrylate, acrylic acid or maleic anhydride, or copolymers of any of these comonomers grafted with polyolefins, or blends of these copolymers with the same or with propylene homopolymers, co-, or terpolymers.

According to another preferred embodiment, the outer tie layer 14 comprises propylene homopolymer or propylene co-, or terpolymer with ethylene and/or 1-butene, grafted with polar comonomers such as vinyl acetate, methyl (meth) acrylate, butyl (meth) acrylate, acrylic acid or maleic anhydride and blends of homo-, co- or terpolymers of propylene with copolymers of ethylene with polar comonomers such as vinyl acetate, methyl (meth) acrylate, butyl (meth) acrylate, acrylic acid or maleic anhydride.

According to an even more preferred embodiment, the outer tie layer 14 comprises propylene homopolymers or propylene co- or terpolymers with ethylene and/or 1-butene grafted with maleic anhydride or blends of these copolymers grafted with propylene homo-, co-, or terpolymers with ethylene and/or 1-butene. Grafted copolymers can be selected from the group comprising PolyBond 3150 (Chemtura), Admer QF500A, Admer AT1179E (Mitsui Chemicals Europe), G-3003 (Eastman), Fusabond MD511D (DuPont), SCONA TPPP 9212 FA/GA (Byk Chemie) and similar resins.

In accordance with possible embodiments, the outer tie layer 14 may have a thickness comprised between about 1 μm and about 6 μm.

According to preferred embodiments of the present disclosure, the outer skin layer 16 is made of a blend of amorphous polyamide and polyamide of crystalline or semi-crystalline type.

In fact, the Applicant has found that a blend of the two types of polyamides allows to exploit their inherent properties by overcoming their limitations.

On the one hand, amorphous polyamide because of its intrinsic properties is easily and effectively stretchable also with polypropylene, while semicrystalline polyamide has oxygen, gas and aroma barrier properties higher than that provided by amorphous polyamide.

Therefore, in relation to the desired final film properties and processing parameters, in the method according to the disclosure the percentages of amorphous polyamide and semicrystalline polyamide may vary between 25% and 75%, preferred between 35% and 65%, more preferred between 30% and 60% and 75% and 25%, preferred between 65% and 35%, more preferred between 60% and 40%, respectively, (by weight, to the total weight of the outer skin layer) to obtain the final composition.

For example, if the barrier effect is preferred over stretching properties, the outer skin layer 16 may be composed of 25% amorphous polyamide and semicrystalline polyamide for the remaining 75%.

In an opposite example, if the stretch effect is to be considered primarily over a barrier effect, the outer skin layer 16 may be composed of 75% amorphous polyamide and 25% semicrystalline polyamide.

Any possible combination within the above limits may be foreseen, for example, 30%-70%, 35%-65%, 40%-60%, 45%-65%, 47%-53%, 49%-51%, 53%-47%, 55%-45%, 60%-40%, 65%-35%, 70%-30% or other intermediate values included in the intervals.

According to some embodiments, the outer skin layer 16 may have a thickness comprised between about 0.3 μm and about 10 μm.

According to other embodiments, the outer skin layer 16 may have a thickness comprised between about 0.3 μm and 2 μm.

According to other embodiments, the outer skin layer 16 may have a thickness comprised between about 0.4 μm and 1.7 μm.

According to further embodiments, the outer skin layer 16 may contain anti-blocking additives, the average size of which may be within the range of 50% to 500% of the total thickness of the outer skin layer 16, so as to protrude at least partially from the latter.

According to further embodiments, the outer skin layer 16 may comprise a small percentage of copolymers of olefins comprising polar comonomers such as vinyl acetates, alkyl acrylates, alkyl methacrylates, acrylic acid or maleic anhydride.

According to some embodiments, the outer skin layer 16 may correspond to a layer of film 10, which, in use, is in contact with the outer environment, or to a layer facing in any case outwardly with respect to the base layer 12.

Such outer skin layer 16 based on polyamide is advantageous to provide a surface with high surface tension, or dyne level, long-term printability or, especially in conjunction with vacuum metallization, enhanced or even outstanding barrier against the permeation of e.g. oxygen, mineral oil, or aromas.

According to some embodiments, on the outer skin layer 16, depending on the applications and uses, a treatment of the surface can be performed, selected from a group comprising corona treatment, flame treatment and plasma treatment, or other treatment technologies.

Further, in accordance with some embodiments, the outer skin layer 16 may be coated with metal, metal oxide, organic or inorganic lacquers, or a combination thereof, to provide a further outer layer of film 10 and to obtain a greater barrier effect.

Figure 2:
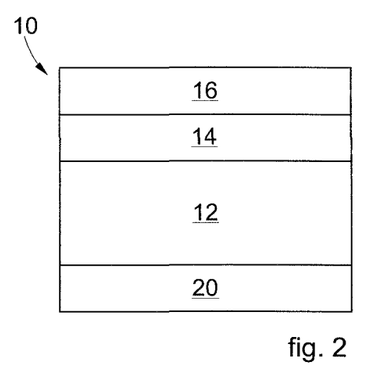
FIG. 2 is a schematic sectional view of a film according to further embodiments described herein.

In accordance with some embodiments described, for example, with reference to FIG. 2, the film 10 also comprises an inner skin layer 20 opposite the outer skin layer 16. According to possible embodiments, the inner skin layer 20 may include propylene homopolymer, copolymer or terpolymer, copolymers of alpha-olefins comprising ethylene or propylene co-monomers, propylene or ethylene elastomers, or mixtures thereof.

Figure 3:
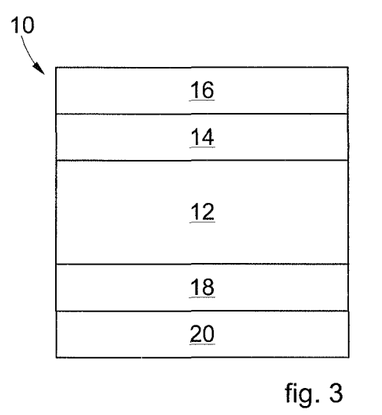
FIG. 3 is a schematic section view of a film according to further embodiments described herein.

According to further embodiments, illustrated for example in FIG. 3, the film 10 may also include an inner tie layer 18 disposed between the base layer 12 and the inner skin layer 20.

In accordance with these embodiments, the inner tie layer 18 may include propylene homopolymer or co-polymer.

Figure 4:
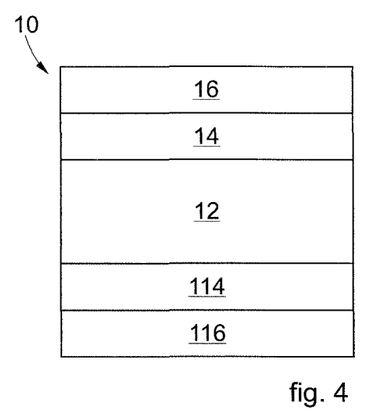
FIG. 4 is a schematic section view of a film according to further embodiments described herein.

In accordance with other embodiments described, for example, with reference to FIG. 4, film 10 comprises an inner tie layer 114 based on copolymers of olefins comprising polar comonomers, adjacent to the inner face of the base layer 12.

Examples of polar comonomers may be vinyl acetate, alkyl acrylates, alkyl methacrylates, acrylic acid or maleic anhydride.

According to some embodiments, the film 10 further comprises an inner skin layer 116, adjacent to an inner face of the inner tie layer 114, based on polyamide.

In accordance with possible embodiments, the inner skin layer 116 based on polyamide comprises a blend of 25% to 75% (by weight) of amorphous polyamide and 75% to 25% (by weight) of semicrystalline polyamide.

According to possible embodiments, the film 10 may thus have a symmetrical structure, wherein the inner skin layer 116 may have characteristics, thickness and composition substantially similar to that of the outer skin layer 16, and the inner tie layer 114 may have characteristics, thickness and composition essentially similar to those of the outer tie layer 14.

Suitable amorphous polyamides can be selected, by way of non-restrictive example, within the group comprising polyamide 4I (consisting essentially of tetramethylenediamine and isophthalic acid), polyamide 4I/4T (tetramethylenediamine copolymers with a mixture of isophthalic acid and acid terephthalic acid), polyamide 6I (consisting essentially of hexamethylene diamine and isophthalic acid), polyamide 6I/6T (hexamethylenediamine copolymers with a mixture of isophthalic acid and terephthalic acid)), polyamide 6I/69/66 (hexamethylene diamine copolymers with a mixture of isophthalic acid, azelaic acid and adipic acid), polyamide DT/DI (copolymers of 2-methyl pentamethylene diamine with a mixture of isophthalic acid and terephthalic acid), or polyamide 6/3-T (resins based on terephthalic acid and 2,2,4-trimethyl[hexam]etylene diamine).

Suitable semicrystalline polyamides can be selected, by way of non-restrictive example, from the group of copolymers comprising polyamide 6, polyamide 6/6T, polyamide 6.6, polyamide 6/6.6, polyamide 4.6, polyamide 4.10, polyamide 4.12, polyamide 6.10, polyamide 6.12, polyamide MDX6, or polyamide 6/3-T.

These amorphous and semi-crystalline polyamides preferably have a viscosity in the range of 100-3000 cm$^3$/g, more preferably 180-400 cm$^3$/g, more preferably 200-260 cm$^3$/g.

According to possible embodiments, amorphous polyamides can be selected from polyamide 6/3-T, polyamide 4I/4T and polyamide 6I/6T, polyamide 6I/69/66, polyamide 6/6.6, polyamide DT/DI, semi-crystalline polyamides can be selected from polyamide 6, polyamide 6-3T, polyamide 6/6T copolymer, polyamide 6/6.6, polyamide 6.10, and polyamide MDX6. Commercial examples of amorphous polyamides are Grilon FE4494, Grilon FE4495, Grivory G21 (EMS), Selar® PA 3626 (Du Pont), Trogamid T5000 (Evonik), Novadyn DT/DI, examples of semicrystalline polyamides are Ultramid C33L01 (BASF), K7007C (Mitsubishi Gas Chemical Co), Grilon F34 (EMS), TrogamidMX97.

Figure 5:
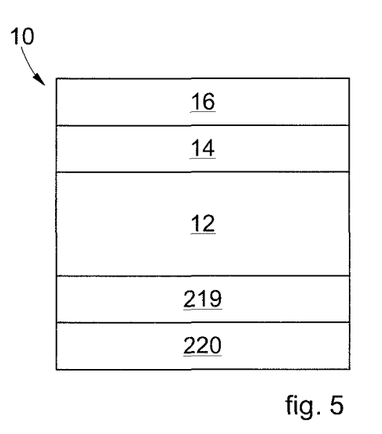
FIG. 5 is a schematic sectional view of a film according to further embodiments described herein.

According to a further embodiment described with reference to FIG. 5, the film 10 further comprises an inner tie layer 219 adjacent to the inner face of the base layer 12, comprising copolymers or terpolymers of propylene, or ethylene or propylene plastomers, or mixtures thereof.

According to further embodiments, the inner tie layer 219 may optionally include pigments, antistatic agents, and/or other additives.

According to further embodiments, the inner skin layer 219 may have a thickness comprised between 2 μm and 6 μm, particularly between 2.5 μm and 5 μm.

In accordance with this variant embodiment, the film 10 further comprises an inner skin layer 220 adjacent to an inner face of the inner tie layer 219 and based on propylene homopolymer, copolymer or terpolymer, alpha-olefins copolymers comprising ethylene or polypropylene co-monomers, propylene or ethylene elastomers, polyethylene, or blends thereof.

According to further embodiments, the inner skin layer 20, 220 may be optionally subjected to treatment, for example flame, corona or other technologies.

In accordance with further embodiments, the inner skin layer 20, 220 may also include anti-blocking agents such as synthetic silica particles, crosslinked siloxane particles and/or cross-linked poly methyl methacrylate particles (PMMA), all of them of roughly spherical shape. Preferably, these antiblocking particles are either incorporated in the main component or provided dispersed in a suitable polyolefin, preferably a polypropylene resin.

In accordance with variants of embodiments, the inner skin layer 20, 220 preferably contains poly methylmethacrylate particles (PMMA).

In accordance with some embodiments, the PMMA particles may have a substantially spherical shape and exhibit a narrow distribution of the particle size. According to a non-limiting example, Schulman's commercial product ABVT22SC (PP-based masterbatch) can be used.

In accordance with further embodiments, the inner skin layer 20, 220 may also include silica particles. According to a non-limiting example, Sylobloc 44 or Sylobloc 45 as in Schulman's commercial product ABPP05SC (PP-based masterbatch) can be used.

In accordance with further embodiments, the inner skin layer 20, 220 may also include crosslinked substantially spherical siloxane particles. According to a non-limiting example, a commercial product under the tradename of Tospearl can be used.

According to a possible exemplary solution, the inner skin layer 20, 220 may be composed for the most portion of propylene co- and/or terpolymers and/or poly butene-1 copolymers, or blends thereof, for example between 95% and 99.9% in total, and for the remaining portion of poly methyl methacrylate particles, from 0.1% to 5%.

According to further embodiments, the inner skin layer 20, 220 may have a thickness comprised between 0.7 μm and 3 μm, particularly between 0.8 μm and 2 μm, even more particularly between 0.9 μm and 1.5 μm.

According to a further embodiment, particularly suitable for the production of labels, described with reference to FIG. 6, the film 10 comprises an inner tie layer 312, adjacent to the inner face of the base layer 12, and comprising propylene homopolymer.

The inner tie layer 312, according to this embodiment, may have a composition substantially similar to that of the base layer 12. In this way, having two layers of propylene homopolymer, the rigidity characteristics of the film 10 can be improved.

According to some embodiments, the inner tie layer 312 may have a thickness comprised between 2 µm and 6 µm, particularly between 2.5 µm and 5 µm.

In accordance with this embodiment, the film 10 further comprises an inner skin layer 321, adjacent to an inner face of the inner tie layer 312, made of a propylene homo- or copolymers modified with maleic anhydride or blends thereof with other, non-modified propylene homo- or copolymers. The inner skin layer 321 according to this embodiment can advantageously be used as a layer for printing images, graphic and/or signs.

According to possible variant embodiments, the inner skin layer 321 may also include inorganic fillers and/or anti-blocking agents.

According to some embodiments, the inner skin layer 321 may have a thickness comprised between 0.3 µm and 2 µm.

Figure 6:
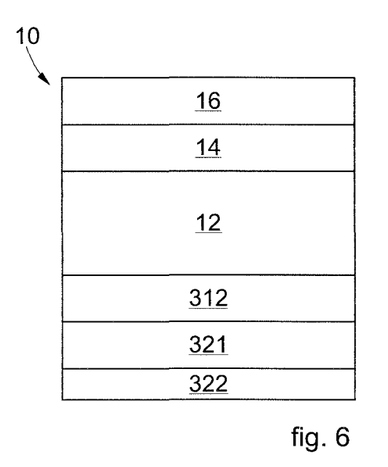
FIG. 6 is a schematic section view of a film according to further embodiments described herein.

According to the embodiment described as an example with reference to FIG. 6, the film 10 comprises an inner coating layer 322, adjacent to the inner skin layer 321, which, according to a non-limiting example, may be based on aliphatic polyurethane or a poly aziridin. Suitable coatings are e.g. available under the tradename of R600, R610, R1010 from DSM. Other suitable coatings like poly acrylates or poly styrene acrylates, available from various suppliers may require the prior application of a primer containing either an aliphatic PU like R600 or a poly aziridin as available e.g. from BASF.

For example, for an aliphatic polyurethane coating, the inner coating layer 322 can be made with a grammage, or thickness, ranging from about 0.01 g/m$^2$ to about 1 g/m$^2$, preferably between 0.02 g/m$^2$ and 0.04 g/m$^2$.

According to further embodiments, further inner coating layers 322 may be provided adjacent to a respective skin layer 20, 116, 220, 321.

Other, non-limiting examples for the inner coating layer 322 can be: acrylate based lacquers, anti-fog lacquers, release lacquers (also silicone based), PVDC lacquers.

According to possible variant embodiments, the inner coating layer 322 can be: EVA coating applied by extrusion coating adjacent to a respective skin layer 20, 116, 220, 321.

According to possible variant embodiments, the film 10 can comprise a second inner coating layer, not shown, adjacent to an inner face of the inner coating layer 322, based on acrylate based lacquers, anti-fog lacquers, release lacquers (also silicone based), or PVDC lacquers.

In some embodiments, the second inner coating layer can have a grammage of between 0.8 g/m$^2$ and 3 g/m$^2$, preferably between 1.0 g/m$^2$ and 2.5 g/m$^2$.

According to preferred embodiments, the film 10 according to the present disclosure provides a shrinkage at 130° C. of less than 7%, more preferred less than 5% in both MD and TD directions.

According to embodiments which are particularly preferred a film 10 according to this disclosure can comprise:
- a base layer 12, or core layer, based on polypropylene (PP), having an inner face and an outer face which may have a thickness comprised between about 10 µm and about 100 µm, in particular between about 15 µm and about 70 µm, more in particular between about 17 µm and about 60 µm, based on polypropylene, may optionally contain between 1.5 and 30 of titanium dioxide, further optionally contain between 1.5 and 23% CaCO3 or 1 to 15% PBT, and optionally EAA and/or GMS and/or amides of fatty acids;
- an outer tie layer 14 adjacent to the outer face of the base layer 12 of a thickness between about 1 µm and about 6 µm and based on copolymers of olefins comprising polar comonomers, preferentially propylene homopolymers or propylene co- or terpolymers grafted with maleic anhydride or blends of these copolymers grafted with propylene homo-, co-, or terpolymers;
- an outer skin layer 16, adjacent to the outer face of the outer tie layer 14, and of between about 0.3 µm and 2 µm. preferentially between about 0.4 µm and 1.7 µm and which is optionally corona or flame treated, based on a blend of at least one amorphous and one semi-crystallin based on polyamide preferred in a ratio of between 65% and 35%, more preferred between 60% and 40%, of a viscosity in the range of 180-400 cm$^3$/g, more preferably 200-260 cm$^3$/g;
- an inner tie layer 219 adjacent to the inner face of the base layer 12 of between 2 µm and 6 µm, particularly between 2.5 µm and 5 µm, comprising copolymers or terpolymers of propylene, or ethylene or propylene plastomers, or mixtures thereof, which may optionally include pigments, antistatic agents, and/or other additives;
- an inner skin layer 220 adjacent to an inner face of the inner tie layer 219 of a thickness between 0.8 µm and 2 µm, preferably between 0.9 µm and 1.5 µm, and based on propylene homopolymer, copolymer or terpolymer, alpha-olefins copolymers comprising ethylene co-monomer, propylene or ethylene elastomers or blends thereof and may also include anti-blocking agents, in a portion of 0.1 to 5% of the inner skin layer, such as synthetic silica particles, crosslinked siloxane particles and/or cross-linked poly methyl methacrylate particles (PMMA), all of them of roughly spherical shape, preferably cross-linked PMMA particles of substantially spherical shape and narrow distribution of the particle size;
- and optionally an inner coating layer 322 adjacent to an inner face of the inner skin layer 220 an inner coating with a grammage of between about 0.01 g/m$^2$ to about 1 g/m$^2$, preferably between 0.02 g/m$^2$ and 0.04 g/m$^2$, which may be based on aliphatic polyurethane or a poly aziridin, or an inner coating based on EVA resin applied by extrusion coating.

According to other embodiments which are particularly preferred, a film 10 according to this disclosure can comprise:
- a base layer 12, or core layer, based on polypropylene (PP), having an inner face and an outer face which may have a thickness comprised between about 10 µm and about 100 µm, in particular between about 15 µm and about 70 µm, more in particular between about 17 µm and about 60 µm, based on polypropylene, may optionally contain between 1.5 and 30 of titanium dioxide, further optionally contain between 1.5 and 23% CaCO3 or 1 to 15% PBT, and optionally EAA and/or GMS and/or amides of fatty acids;
- an outer tie layer 14 adjacent to the outer face of the base layer 12 of a thickness between about 1 µm and about 6 µm and based on copolymers of olefins comprising polar comonomers, preferentially propylene homopolymers or propylene co- or terpolymers grafted with maleic anhydride or blends of these copolymers grafted with propylene homo-, co-, or terpolymers;
- an outer skin layer 16, adjacent to the outer face of the outer tie layer 14, and of between about 0.3 µm and 2 µm, preferentially between about 0.4 µm and 1.7 µm and which is optionally corona or flame treated, based on a blend of at least one amorphous and one semi-crystalline based on polyamide preferred in a ratio of between 65% and 35%, more preferred between 60% and 40%, of a viscosity in the range of 180-400 cm3/g, more preferably 200-260 cm³/g;

an inner tie layer 312, adjacent to the inner face of the base layer 12 of between 2 μm and 6 μm, particularly between 2.5 μm and 5 μm, and comprising propylene homopolymer, optionally having a composition substantially similar to that of the base layer 12;

an inner skin layer 321, adjacent to an inner face of the inner tie layer 312 of a thickness between 0.3 and 2 μm, made of a propylene homo- or copolymers modified with maleic anhydride or blends thereof with other, non-modified propylene homo- or copolymers, optionally also comprising inorganic fillers and/or anti-blocking agents;

optionally a inner coating layer 322, adjacent to the inner skin layer 321 with a grammage of between about 0.01 g/m² to about 1 g/m², preferably between 0.02 g/m² and 0.04 g/m², which may be based on aliphatic polyurethane or a poly aziridin;

and, as a further option, a secondary inner coating layer, adjacent to the inner coating layer 322, of a grammage of between 0.8 and 3 g/m², preferably between 1.0 g/m² and 2.5 g/m², based on acrylate based lacquers, anti-fog lacquers, release lacquers (also silicone based), PVDC lacquers;

with the film produced on a typical sequential BoPP line in a process comprising essentially the steps cast on a chill-roll, reheating and stretching in MD direction, further reheating and stretching in TD direction, with optionally subsequent treatment of one or both film faces;

with the film providing a shrinkage at 130° C. of less than 7%, preferably less than 5% in both MD and TD direction, after vacuum metallization and excellent oxygen barrier and unusual barrier against mineral oil and aroma permeation, and excellent long-term printability.

A method to make a bi-axially orientated film based on polypropylene and polyamide, suitable for making food packages having an oxygen barrier effect and formed by a plurality of layers superimposed on one another comprises the following steps:

a first co-extrusion step, by means of a flat head extrusion die unit to produce a co-extruded intermediate product in the form of an intermediate film;

a second step of stretching in the machine direction (MD), and a third step of stretching in a direction transverse to the machine direction (TD) of the intermediate product to determine the desired bi-axially orientated structure and the mechanical properties of the film.

According to some embodiments, downstream of the co-extrusion step, a cooling, or crystallization step of the melted product is provided on a chill roll.

The method according to the disclosure provides to co-extrude an intermediate film comprising at least a base layer 12 based on polypropylene, an outer tie layer 14 based on olefin copolymers comprising polar comonomers such as vinyl acetate, alkyl acrylates, alkyl methacrylates, acrylic acid or maleic anhydride and an outer skin layer 16 based on polyamide.

In order to realize the outer skin layer 16, the method provides in particular to use a blend of amorphous polyamide and semicrystalline polyamide, comprising 25% to 75% (by weight) amorphous polyamide and 75% to 25% (by weight) polyamide semi-crystalline.

The second stretching step in the machine direction (MD) provides in particular to stretch the intermediate product by a factor from 3 to 6, preferably by a factor of 4.5 to 5.4 in the direction of advancement of the intermediate product (machine direction or MD).

Finally, after stretching in the machine direction (MD), the third stretching step involves stretching the intermediate product in the direction transverse to the machine direction (TD) by a factor from 7 to 12, preferably by a factor of 8 to 10.

The stretching factor in the machine direction (MD) and in the transverse direction (TD) can be chosen each, or one with respect to the other, to ensure a manufacturing run without breaks, and to match the targeted characteristics of the final film 10.

According to further embodiments, after the stretching step in the machine direction (MD) and in the transverse direction (TD), the method can comprise a treatment step of the outer skin layer 16, for example with corona, flame, plasma, or other technology prior to the stretching step in the transverse direction (TD).

The disclosure will now be described with reference to some specific examples employing the following materials.

Materials

EMS Grilon FE4495 is an amorphous nylon 6I/69/66 copolymer, essentially consisting hexamethylene diamine with isophthalic acid, azelaic acid, and adipic acid;

BASF Ultramid C33L01 is a semicrystallin nylon 6/66;

Mitsui QF500A is a polypropylene homopolymer grafted with maleic anhydride;

Total 3371 is a polypropylene homopolymer;

DuPont Selar PA2072 is a amorphous nylon 6I/6T of essentially hexamethylene diamine with isophthalic acid and terephthalic acid;

EMS Grilon F34 is a nylon 6;

Novadyn DT/DI is an amorphous nylon copolymer, essentially consisting 2-methyl pentamethylene diamine with terephthalic acid and isophthalic acid;

Mitsubishi K7007C is a semicrystalline nylon MDX6, essentially a polycondensate of MDXA with adipic acid;

Mitsui AT1179E is a polypropylene homopolymer with maleic anhydride;

Sabic PP524P is a polypropylene homopolymer;

Schulman P80560 comprises 60% titanium dioxide (TiO2) in a propylene homopolymer carrier;

Schulman PF97NTS comprises 70% calcium carbonate (CaCO3) in a propylene homopolymer carrier;

EVONIK Trogamid MX97 is a semicrystalline nylon essentially consisting of 2,2,4- and 2,4,4-trimethyl hexamethylen diamine and terephthalic acid polycondensate;

Braskem DS6D82 is a propylene ethylene copolymer with a melting point of 134° C.;

Schulman ABPP05SC comprises 5% of a 3.4 micron silica antiblocking agent dispersed in a propylene ethylene copolymer;

Schulman P8266 comprises 60% titanium dioxide (TiO2) in a propylene homopolymer carrier;

Schulman PF97 comprises 70% calcium carbonate (CaCO3) in a propylene homopolymer carrier;

LyondelBasell Adsyl 5C39F: is a terpolymer of C2C3C4 polypropylene;

Test Methods

The test methods employed to evaluate film samples produced according to EXAMPLES 1 through 9 are standardized methods that are indicated in the head of the Table 1 with the following exceptions:

Seals for testing strength were made using a Brugger lab sealer. Conditions employed were: Jaw temperature 130° C., seal pressure 0.27 N/mm$^2$, dwell time 0.5 sec. The seal strength has been determined using a tensile tester with a 500 g load cell. The test speed was 50 mm/min.

The average thickness was calculated as ratio unit weight over density.

The migration rates of octanal as a representative component in the aromas of certain kinds of food and of dodecane (C12H26 paraffin) as a representative component in mineral oils have been determined as follows:

The lower of two identical chambers of the test cell separated by the film test specimen, was loaded with the test substance (migrant), the other was left empty. In the case of octanal the level in the lower chamber was kept at about 2300 μg/L. In the case of dodecane 750 μg/g of the test substance was soaked in into a clean piece of cardboard of about 6 g and mounted to be in full contact with the test specimen. The closed test cell was stored at 30° C., respectively 40° C., for the entire test period. Nitrogen was passed through the empty upper chamber, the permeate was collected in a cold trap at −45° C. equipped with Supelcoport adsorbent over suitable intervals desorbed at 340° C. and tested by gas chromatography/FID, calibrated to quantify the migrant, then flushed with nitrogen. The concentration was monitored for 40 at least days or until the readings were constant. The final value is reported.

Examples: Production Method

A sequential stretching BoPP line equipped with 5 extruders of suitable size and design and a 5-channel flat head extrusion die was used to produce a five layer sheet by coextrusion of the material blends as described in the following examples.

Under conditions typical for production of BoPP films extruder temperatures were set at 245 to 255° C. for polypropylene, 245 to 260° C. for polyamide and adjusted to achieve a homogeneous melt in required and as known in the art.

The die temperature was about 255° C.

The coextrudate was quenched at 30° C. on a cast roll, reheated on rolls to 128° C. and stretched 4.8 times its original length in the machine direction. The sheet was subsequently reheated at 170° C., stretched 9 times its original width in a tenter apparatus at 160° C., annealed at 165° C. and the inner skin surface was corona treated before being wound on a roll. Line speed was 20 mpm. The overall film thickness was 30 μm.

As required the film produced as described was subsequently metallized with aluminum on the polyamide outer skin layer to an optical density 2.3 employing conventional vacuum metallization techniques. The film properties are summarized in Table 1 below.

Example 1

Composition:
outer skin layer: thickness 1.0 μm; Composition: EMS FE4495 40%+Ultramid C33L01 60%;
outer tie layer: thickness 2.0 μm; Composition: Mitsui QF500A 100%;
base layer: nominal thickness 22 μm; Composition: Total 3371 100%;
inner tie layer: thickness 2.0 μm; Composition: Total 3371 100%;
inner skin layer: thickness 1.0 μm; Composition: Adsyl 5C39F 100%.

Line speed was 20 mpm. The overall film thickness was 30 μm.

The clear film was vacuum metallized with aluminum on the polyamide skin to an optical density 2.3 employing conventional vacuum metallization techniques.

Examples 2 to 4 and Comparative Example 1

Using essentially the same method as described for EXAMPLE 1, however, with different composition of the outer skin layer and the outer tie layer the following film samples have been manufactured. The thickness of the core was adapted to meet the required film thickness by changing the core layer extruder out-put accordingly.

Example 2 outer skin layer: thickness 1.0 μm; Composition: Selar PA2072 40%+Grilon F34 60%;
outer tie layer: thickness 2.0 μm; Composition: Mitsui QF500A 100%.

Example 3 outer skin layer: thickness 0.8 μm; Composition: Novadyn DT/DI 50%+Mitsubishi K7007C 50%;
outer tie layer: thickness 3.0 μm; Composition: Mitsui QF500A 100%.

Comparative Example CE-1 outer skin layer: thickness 1.0 μm; Composition: Novadyn DT/DI 20%+Mitsubishi K7007C 80%;
outer tie layer: thickness 4.0 μm; Composition: Mitsui QF500A 100%.

Observations:
With the percentages of amorphous polyamide and semicrystalline polyamide shown above, during the casting on the chill roll there are non-fused parts that partially accumulate on the lip of the flat head extrusion die and partially pass to the film. These non-fused parts, during the transverse stretching (TD) step, cause the film to break, making it impossible to produce a film having the features described in the disclosure.

Example 4 outer skin layer: thickness 1.0 μm; Composition: Novadyn DT/DI 25%+Mitsubishi K7007C 75%;
outer tie layer: thickness 4.0 μm; Composition: Mitsui QF500A 100%.

Example 5

Using essentially the same method as described in EXAMPLE 1, however, employing the following materials to make a film of pearlescent white appearance before metalizing:
outer skin layer: thickness 0.8 μm; Composition: Novadyn DT/DI 50%+Trogamid MX97 50%;
outer tie layer: thickness 2.0 μm; Composition: Mitsui AT1179E 100%;

base layer: nominal thickness 49.2 µm; Composition: Sabic PP524P 89%+Schulman P80560 2%+Schulman PF97NTS 9%;
inner tie layer: thickness 3.5 µm; Composition: Mitsui AT1179E 100%;
inner skin layer: thickness 1.5 µm; Novadyn DT/DI 50%+Trogamid MX97 50%.

The line speed was 180 mpm. The film had the following properties:
Total Film Thickness: 57 µm;
Unit weight: 41.0 g/m$^2$;
Density: 0.72 g/cm$^3$.

Example 6

The pearlescent white film of EXAMPLE 5 was vacuum metallized with aluminum on the outer polyamide skin to an optical density 3.3 employing conventional vacuum metallization techniques.

Examples 7 to 8

Using essentially the same method as described for EXAMPLE 5, however, with different composition of the outer skin layer and the outer tie layer the following film samples have been manufactured. The line speed was 180 mpm. The output of the core extruder and the stretching conditions were adapted to meet the required film thickness, density and unit weight.

Example 7 outer skin layer: thickness 0.8 µm; Composition: Grilon G21 60%+Mitsubishi K7007C 40%;
outer tie layer: thickness 2.0 µm; Composition: Mitsui AT1179E 100%,

Example 8 outer skin layer: thickness 0.8 µm; Composition: Grilon G21 75%+Mitsubishi K7007C 25%;
outer tie layer: thickness 2.0 µm; Composition: Mitsui AT1179E 100%,

Example 9

Using essentially the same method as described in EXAMPLE 5, however, employing the following materials. The line speed was 180 mpm. The thickness of the core was adapted to meet the required film thickness by changing the core layer extruder out-put accordingly.
Composition:
outer skin layer: thickness 1.3 µm; Composition: Novadyn DT/DI 50%+Trogamid MX97 50%;
outer tie layer: thickness 4.0 µm; Composition: Mitsui AT1179E 100%,
base layer: thickness 26.7 µm; Composition: Sabic PP524P 89%+Schulman P80560 2%+Schulman PF97NTS 9%;
inner tie layer: thickness 2.0 µm; Composition: Sabic PP524P 88%+Schulman P80560 12%,
inner skin layer: thickness 1.0 µm; Adsyl 5C39F 50%+ Tafmer XM7070 48%+ABVT22SC 3%.

The line speed was 180 mpm. The film had the following properties:
Total Film Thickness: 35 µm;
Unit weight: 25.2 g/m$^2$;
Density: 0.72 g/cm$^3$.

Table 1 below reports the mechanical and physical properties of the above described films:

TABLE 1

| Example No | Optical Density after metallization spectrophotometrically | WVTR (38 C./ 90% rH) ASTM F1249 | OTR (23 C./ 0% rH) ASTM D3985 | Aroma Transm Rates (Octanal, µg/dm$^2$/d) Internal method, 30 C. | Mineral Oil Transm Rates ($C_{12}H_{24}$, µg/dm$^2$/d) Internal method, 40 C. | Remark | average Thickness (µm) calculated from Unit Weight and Density | Unit Weight (g/m$^3$) based on ASTM D4321 | Density (g/cm$^3$) ASTM 792 | Tensile Strength (N/mm$^2$) MD    TD ASTM D882 | Elongation at Break (%) MD |
|---|---|---|---|---|---|---|---|---|---|---|---|
| 1 |  | 0.19 | 0.7 |  |  |  | 19.7 | 17.9 | 0.91 | 102    190 | 239 |
| 2 |  | 0.2/0.26 | 0.8/2.1 |  |  | 1) | 19.9 | 18.1 | 0.91 | 104    187 | 240 |
| 3 |  | 0.12 | 0.3 |  | <0.3 |  | 19.8 | 18.0 | 0.91 | 105    219 | 235 |
| CE-1 |  | 0.3 | 3 |  |  | 2) |  |  |  |  |  |
| 4 |  | 0.2 | 0.8 |  |  |  | 19.8 | 18.0 | 0.91 | 103    218 | 235 |
| 5 |  |  |  | 28 | 30 | 3) | 57.0 | 41.0 | 0.72 | 90 | 150 |
| 6 | 3.3 | 0.1 | 0.1 | <0.0002 | <0.3 | 4) |  |  |  |  |  |
| 7 | 3.3 | 0.1 | 0.1 |  |  | 5) | 50.0 | 45.5 | 0.91 | 110 | 220 |
| 8 |  |  |  |  |  | 6) |  |  |  |  |  |
| 9 | 3.3 | 0.1 | 0.1 | <0.0002 | <0.3 |  | 34.5 | 25.7 | 0.74 | 84    184 | 211 |

| Example No | Elongation at Break (%) TD ASTM D882 | Haze/ Light Transmission (%) ASTM D1003 | Gloss (outer face, %) ASTM 2457 | Thermal Shrinkage (%) MD    TD ASTM D1204 | Surface Tension (outer face, mN/m) ASTM 2578 | Seal Strength @ 130 C. (g/10 mm) internal method | COF outer/outer stat    dyn ASTM D1894 | COF inner/inner stat    dyn |
|---|---|---|---|---|---|---|---|---|
| 1 | 42 | 4.30 | 87 | 2.5    0.0 | 52 | 485 | 0.78    0.75 | 0.56    0.35 |
| 2 | 40 | 3.77 | 84 | 2.5    0.0 | 51 | 460 | 0.82    0.78 | 0.50    0.33 |
| 3 | 52 | 3.91 | 86 | 2.5    0 | 52 | 387 | 0.84    0.75 | 0.65    0.35 |

TABLE 1-continued

| CE-1 | | | | | | | | | | |
|---|---|---|---|---|---|---|---|---|---|---|
| 4 | 54 | 3.73 | 85 | 2.5 | 0.0 | 52 | 350 | 0.65 | 0.83 | 0.45 | 0.32 |
| 5 |  | 15.00 | 119 | 4.0 |  | 52 | 300 |  |  |  |  |
| 6 |  |  |  |  |  |  |  |  |  |  |  |
| 7 |  | 3.00 | 96/82 | 2.7 |  | 50 | 310 |  |  |  |  |
| 8 |  |  | 78/62 |  |  | 51 |  |  |  |  |  |
| 9 | 47 | 38.40 | 88 | 3.0 | 0.5 | 51 | 265 | 0.52 | 0.25 | 0.31 | 0.17 |

1) OTR data are highly variable
2) No data collected due to non-fused parts which caused the film to break in the transvers stretching step
3) Transmission rates refer to the non-metalized film, high optical quality, very smooth surface
4) Transmission rates refer to film samples of EXAMPLE 5 after vacuum metalization, very good appearance, close to "mirror quality"
5) Appearance good in the center, cloudy with some specks and pits close to the edges
6) Appearance "still acceptable" in the center, in homogenous with easily visible defects towards the edges It is clear that modifications and/or additions of parts may be made to the film 10 as described heretofore, without departing from the field and scope of the present disclosure.

It is also clear that, although the present disclosure has been described with reference to some specific examples, a person of skill in the art shall certainly be able to achieve many other equivalent forms of film, having the characteristics as set forth in the claims and hence all coming within the field of protection defined thereby.

The invention claimed is:

1. A bi-axially orientated polypropylene film, having a thickness comprised between 10 μm and 120 μm, obtained by means of flat die co-extrusion and sequential stretching respectively in a machine direction and in a direction transverse to the machine direction, and suitable to make packing, flexible packages, laminated products and labels, wherein the film comprises:
    a base layer based on polypropylene and having an outer face and an inner face,
    an outer tie layer adjacent to the outer face of the base layer and based on copolymers of olefins comprising polar comonomers like vinyl acetates, alkyl acrylates, alkyl methacrylates, acrylic acid or maleic anhydride;
    an outer skin layer, adjacent to an outer face of the outer tie layer, and based on polyamide,
    wherein said outer skin layer comprises a blend of an amorphous polyamide and a semicrystalline polyamide, said blend comprising 25% to 75% (by weight) of amorphous polyamide and 75% to 25% (by weight) of semicrystalline polyamide.

2. The film as in claim 1, further comprising an inner skin layer, opposite the outer skin layer, comprising propylene homopolymer, copolymer, or terpolymer, alpha-olefine copolymers comprising ethylene or propylene comonomers, propylene or ethylene elastomer, polyethylene, or blends thereof.

3. The film as in claim 2, further comprising an inner tie layer, disposed between said base layer and said inner skin layer, comprising propylene homopolymer or copolymer.

4. The film as in claim 1, further comprising an inner tie layer based on copolymers of olefins comprising polar comonomers like vinyl acetates, alkyl acrylates, alkyl methacrylates, acrylic acid or maleic anhydride, adjacent to the inner face of the base layer, and an inner skin layer, based on polyamide, adjacent on an inner face of the inner tie layer, wherein said inner skin layer based on polyamide comprises a blend of 25% to 75% (by weight) amorphous polyamide and 75% to 25% (by weight) semicrystalline polyamide.

5. The film as in claim 1, comprising an inner tie layer, adjacent to the inner face of the base layer, and comprising propylene copolymer, or terpolymer, or C2 C3 plastomers, or blends thereof, and an inner skin layer, adjacent to a inner face of the inner tie layer and comprising propylene homopolymer, copolymer, or terpolymer, alpha-olefine copolymers comprising ethylene or propylene comonomers, propylene or ethylene elastomer, polyethylene, or blends thereof.

6. The film as in claim 5, comprising an inner coating layer, adjacent to an inner face of said inner skin layer and based on aliphatic polyurethane or a poly aziridin, or EVA resin.

7. The film ad in claim 1, comprising an inner tie layer, adjacent to the inner face of the base layer, and comprising propylene homopolymer, and an inner skin layer, adjacent to a inner face of the inner tie layer, based on a blend of polypropylene copolymers modified with maleic anhydride.

8. The film as in claim 7, comprising an inner coating layer, adjacent to an inner face of said inner skin layer and comprising aliphatic polyurethane.

9. The film as in claim 1, wherein said outer tie layer is based on copolymers of ethylene with polar comonomers like vinyl acetate, methyl acrylate, butyl acrylate or acrylic acid or maleic anhydride, or graft copolymers of any of these comonomers with polyolefins.

10. The film as in claim 1, wherein said outer skin layer is treated with flame, corona, or plasma.

11. The film as in claim 1, wherein said outer skin layer is coated with metal, metal oxide, organic or inorganic lacquers, or a combination thereof.

12. The film as in claim 1, wherein said base layer comprises at least one of fillers, voiding agents, hard resins, additives.

13. The film as in claim 1, wherein said outer skin layer has a thickness comprised between about 0.3 μm and 10 μm.

14. The film as in claim 1, wherein said outer skin layer has a thickness comprised between about 0.3 μm and 1 μm.

15. The film as in claim 1, wherein said film has a shrinkage at 130° C. of less than 7% in both machine direction and transverse direction.

16. A method to make a bi-axially orientated polypropylene film having a thickness comprised between 10 μm and 120 μm and suitable to make packing, flexible packages, laminated products and labels, comprising the following steps:
    a first co-extrusion step, by means of a flat die extrusion unit, to make a co-extruded intermediate product in the form of a film,
    a second step of stretching in the machine direction and
    a third step of stretching in a direction transverse to the machine direction, of the intermediate product, so as to determine the desired bi-axially orientated structure and define the final thickness of each of the layers;

wherein the first co-extrusion step provides to extrude an intermediate product formed at least by a base layer based on polypropylene and having an outer face and an inner face, an outer tie layer adjacent to the outer face of the base layer, and based on copolymers of olefins comprising polar comonomers like vinyl acetates, alkyl acrylates, alkyl methacrylates, acrylic acid or maleic anhydride, and an outer skin layer, adjacent to an outer face of the outer tie layer, and based on polyamide, wherein, to extrude said outer skin layer, it provides to use a blend of an amorphous polyamide and a semicrystalline polyamide, said blend comprising 25% to 75% (by weight) of amorphous polyamide and 75% to 25% (by weight) of semicrystalline polyamide, and wherein said second and third steps of stretching provide to stretch the intermediate product by a factor 3 to 6 in the machine direction and subsequently by a factor 7 to 12 in the direction transverse to the machine direction.

* * * * *